July 18, 1950 P. W. NICHOLS 2,515,419
TWO-PART WHEEL AND HUB
Filed Oct. 12, 1946

INVENTOR.
PROCTOR W. NICHOLS
BY
Martin E. Anderson
ATTORNEY

Patented July 18, 1950

2,515,419

UNITED STATES PATENT OFFICE 2,515,419

TWO-PART WHEEL AND HUB

Proctor W. Nichols, Colorado Springs, Colo.

Application October 12, 1946, Serial No. 702,943

1 Claim. (Cl. 301—5)

This invention relates to improvements in two-part wheels.

In many places small wheels having rubber tires, either of the solid, cushion or pneumatic type, are employed. Such wheels may be used in connection with airplanes or with small trucks for use in factories and many other purposes.

It is the object of this invention to produce a wheel of such construction that a rubber tire can readily be applied thereto, or be removed therefrom without the use of any special tools and without subjecting the tire to any severe stretching strains.

It is the further object of this invention to produce a wheel of a simple and substantial construction that can be readily assembled or taken apart and which will have a strong and rigid construction.

A further object of the invention is to produce a wheel of the type described in which the parts can be readily cast, being of such design that each part can be made from a single piece pattern of such shape that it can be readily withdrawn from the mold.

Another object of the invention is to produce a wheel whose tire engaging surface is so constructed that it will interlock with the tire to prevent the latter from turning on the wheel.

The above and other objects that may become apparent as the description proceeds are produced by means of a construction and an arrangement of parts that will now be described in detail and for this purpose reference will be had to the accompanying drawing in which the invention has been illustrated, and in which.

Figure 1:
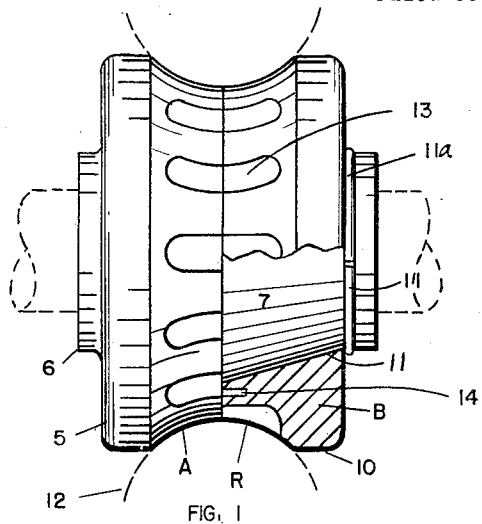
Figure 1 is an edge view of the wheel assembly with a portion of one part broken away to better disclose the construction.
Figure 2:
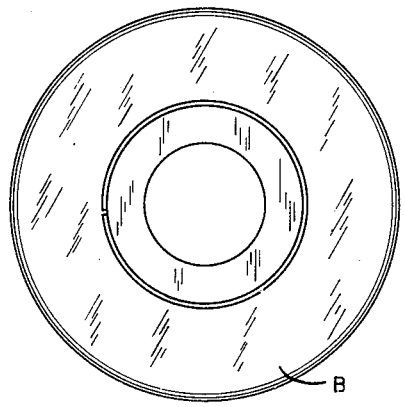
Figure 2 is a side elevation looking towards the left in Figure 1.
Figure 3:
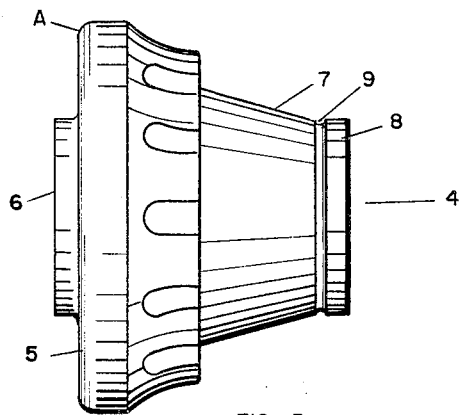
Figures 3 and 3a show the two parts of the wheel in edge elevation.
Figure 3A:
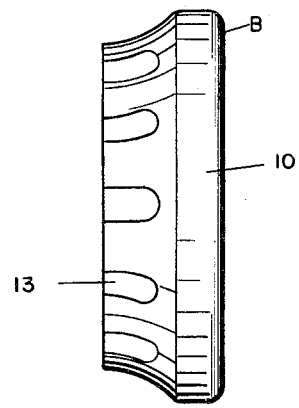
Figure 4:
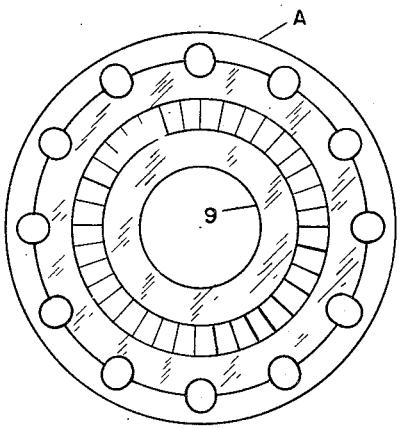
Figure 4 is a side elevation of Figure 3 looking in the direction of arrow 4.

The wheel that forms the subject of this invention consists of two parts which have been designated for identification by letters A and B. The part designated by letter A comprises a circular base 5 having one side provided with a hub 6 and the other side provided with a projection having a frusto-conical surface 7 terminating in a cylindrical extension 8. A groove 9 is provided at the intersection of the cylindrical and the frusto-conical surfaces. An axial opening extends through the wheel part A and forms a bearing for a support shaft which has been indicated by broken lines. Part B is formed from an annular casting having a circular flange 10 and a central opening 11 of frusto-conical shape and of the proper size to receive the conical projection 7 of part A. The two parts A and B are assembled in the manner shown in Figure 1 and after they have been assembled, a spring wire ring 11a is positioned in groove 9 and serves to hold the parts in assembled position. The outer surfaces of parts A and B are curved on a radius R which is the radius of curvature of the tire to be employed. The tire has been indicated by broken lines and designated by reference numeral 12 in Figure 1. The curved surfaces of parts A and B are provided with complementary grooves or depressions 13 that are positioned in alignment, one or more dowel pins 14 or some other equivalent positioning means may be provided to facilitate the rotary adjustment of the parts to bring the depressions into alignment. The tires are provided on their inner surfaces with inwardly extending projections that fit into the depressions 13 and which interlock the tire and the wheel so as to prevent relative rotation. After the tire has been put into position on part A; part B is then positioned around the conical projection 7 and the two parts latched in assembled position by the spring. A wheel thus constructed can be mounted on any machine or vehicle and will be rigid and substantial. Since the parts are cast from some suitable metal, the wheel assembly is very strong and practically all danger of breaking is prevented.

It is known that wheels for the same purpose have been invented, but applicant's wheel is designed for simplicity and strength and wherever it is used there is very small likelihood of any damage being caused by failure of the wheel.

Particular attention is called to the shape of the parts which have been designed as above mentioned, to facilitate casting.

Having described the invention what is claimed as new is:

A two-part wheel, one part having a frusto-conical hub of a length substantially one-half of the width of the wheel, the hub having an axial opening for the reception of a shaft, a circular flange extending radially outward from the larger end of the hub, said flange having parallel end faces, a complementary part of annular shape having parallel end faces and having an opening of frusto-conical shape adapted to engage the frusto-conical hub throughout its entire length and be positioned with its inner flat face abutting the inner flat face of the circular flange, the flange and annular part having complementary transverse arcuate surfaces forming a tire receiving groove, a plurality of spaced grooves substantially semi-circular in cross section extending transversely in the arcuate surfaces and following the contour thereof, said grooves being substantially uniform in depth throughout their length and extending across the juncture of said inner faces, cooperating dowel pins and openings in said inner flat faces for interlocking the two members against relative rotation, the hub having a straight portion extending beyond the outer face of the complementary member, a circumferential groove in said straight portion, and a snap ring positioned in the groove engaging the outer flat surface of the complementary part for retaining it in operative position.

P. W. NICHOLS.

REFERENCES CITED

The following references are of record in the file of this patent:

UNITED STATES PATENTS

| Number | Name | Date |
|---|---|---|
| 383,214 | Cummings | May 22, 1888 |
| 700,509 | Knauber | May 20, 1902 |
| 1,501,743 | Bowen | July 15, 1924 |
| 1,803,019 | Holm | Apr. 28, 1931 |
| 1,869,318 | Swain | July 26, 1932 |
| 1,981,953 | Frank | Nov. 27, 1934 |
| 2,245,444 | Ross | June 10, 1941 |
| 2,280,568 | Brown | Apr. 21, 1942 |